United States Patent
Zhang et al.

(10) Patent No.: US 9,426,233 B2
(45) Date of Patent: *Aug. 23, 2016

(54) MULTI-OBJECTIVE SERVER PLACEMENT DETERMINATION

(71) Applicant: Telefonaktiebolaget L M Ericsson (publ), Stockholm (SE)

(72) Inventors: Ying Zhang, San Jose, CA (US); Du Li, Palo Alto, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/732,009

(22) Filed: Jun. 5, 2015

(65) Prior Publication Data

US 2015/0271280 A1   Sep. 24, 2015

Related U.S. Application Data

(63) Continuation of application No. 13/684,125, filed on Nov. 21, 2012, now Pat. No. 9,083,757.

(51) Int. Cl.
*G06F 15/173* (2006.01)
*H04L 29/08* (2006.01)
(Continued)

(52) U.S. Cl.
CPC .............. *H04L 67/18* (2013.01); *H04L 41/145* (2013.01); *H04L 67/00* (2013.01); *H04L 67/10* (2013.01); *H04L 67/22* (2013.01); *H04L 67/42* (2013.01)

(58) Field of Classification Search
CPC .......... H04L 67/00; H04L 67/18; H04L 67/22
USPC ......................................................... 709/224

See application file for complete search history.

(56) References Cited

U.S. PATENT DOCUMENTS 7,196,705 B2 *  3/2007  Gallivan ................. G06T 11/20
                                                               345/440
9,083,757 B2 *  7/2015  Zhang ................... H04L 41/145
(Continued)

FOREIGN PATENT DOCUMENTS

GB            2367970 A      4/2002

OTHER PUBLICATIONS

"The Google Geocoding API," 15 pages, downloaded from https://developers.google.com/maps/documentation/geocoding/ on Nov. 21, 2012.

(Continued)

*Primary Examiner* — Duyen Doan
(74) *Attorney, Agent, or Firm* — Patent Portfolio Builders, PLLC

(57) ABSTRACT

Methods and apparatus for determining recommended geographic server locations for online social networks by attempting to minimize user-server latency and inter-user communications latency. In an embodiment, geographic and relationship information for a plurality of users is acquired. The plurality of users may belong to one or more networks. The acquired information is transformed into a graph. A first plurality of clusters is generated with a first clustering algorithm. A second plurality of clusters is generated by iteratively examining pairs of the first plurality clusters, and swapping nodes between the examined clusters if it will reduce a total cut weight of the graph and locate each pair of nodes within a defined maximum distance from the centroid of the target cluster. In an embodiment, a method uses a joint analysis approach based upon characteristics of a plurality of existing networks.

20 Claims, 8 Drawing Sheets

(51) Int. Cl.
*H04L 12/24* (2006.01)
*H04L 29/06* (2006.01)

(56) References Cited

U.S. PATENT DOCUMENTS

| | | | |
|---|---|---|---|
| 2011/0078290 A1* | 3/2011 | Calo | G06F 9/5094 709/221 |
| 2012/0116677 A1* | 5/2012 | Higgison | G01S 5/0027 701/518 |

OTHER PUBLICATIONS

"k-medoids," 6 pages, Wikipedia, downloaded from http://en.wikipedia.org/wiki/K-medoid on Nov. 21, 2012.
"Minimum cut," 2 pages, Wikipedia, downloaded from http://en.wikipedia.org/wiki/Minimum_cut on Nov. 21, 2012.
"Vincenty's formulae," 6 pages, Wikipedia, downloaded from http://en.wikipedia.org/wiki/Vincenty's_formulae on Nov. 21, 2012.
"Yahoo! Map Web Services—GeoCoding API," 2 pages, downloaded from http://developer.yahoo.com/maps/rest/V1/geocode.html on Nov. 21, 2012.
Ahn et al., "Analysis of Topological Characteristics of Huge Online Social Networking Services," 2007, 10 pages, WWW 2007, May 8-12, 2007, Banff, Alberta, Canada.
Augustin et al., "Avoiding traceroute anomalies with Paris traceroute," 2006, 6 pages, IMC'06, Oct. 25-27, 2006, Rio de Janeiro, Brazil.
Buchholz et al., "Replica Placement in Adaptive Content Distribution Networks," 2004, 6 pages, SAC'04, Mar. 14-17, 2004, Nicosia, Cyprus.
Cha et al., "Placing Relay Nodes for Intra-Domain Path Diversity," Apr. 2006, 12 pages, INFOCOM 2006.
Charikar et al., "Improved combinatorial algorithms for the facility location and k-median problems," in Proc. of the 40th Annual Symposium on Foundations of Computer Science, 1999, Nov. 15, 1999, 29 pages.
Chen et al., "Dynamic Replica Placement for Scalable Content Delivery," 2002, 6 pages, In Proceedings of IPTPS'02.
Costa et al., "PIC: Practical Internet Coordinates for Distance Estimation," 2004, 10 pages, 24th International Conference on Distributed Computing Systems, 2004.
Cox et al., "Practical, Distributed Network Coordinates," Jan. 2004, 6 pages, ACM SIGCOMM Computer Communication Review, vol. 24 Issue 1.
Cronin et al., "Constrained Mirror Placement on the Internet," 2002, 21 pages, IEEE Journal on Selected Areas in Communications.
Jindal et al., "Opinion Spam and Analysis," 2008, 11 pages, WSDM'08, Feb. 11-12, 2008, Palo Alto, California.
Kumar et al., "Structure and Evolution of Online Social Networks," Aug. 2006, 7 pages, KDD'06, Aug. 20-23, 2006, Philadelphia, Pennsylvania.
Kwak et al., "What is Twitter, a Social Network or a News Media?," Apr. 2010, 10 pages, WWW 2010, Apr. 26-30, 2010, Raleigh, North Carolina.
Li et al., "On the Optimal Placement of Web Proxies in the Internet," Mar. 1999, 9 pages, INFOCOM '99 Eighteenth Annual Joint Conference of the IEEE Computer and Communications Societies.
Mislove et al., "Measurement and Analysis of Online Social Networks," Oct. 2007, 14 pages, IMC'07, Oct. 24-26, 2007, San Diego, California.
Ng et al., "Predicting Internet Network Distance with Coordinates-Based Approaches," 2002, 10 pages, INFOCOM'02.
Oppenheimer et al., "Service Placement in a Shared Wide-Area Platform," 2006, 14 pages, ATEC '06 Proceedings of the annual conference on USENIX '06 Annual Technical Conference.
Padmanabhan et al., "An Investigation of Geographic Mapping Techniques for Internet Hosts," 2001, 13 pages, SIGCOMM'01, Aug. 27-31, 2001, San Diego, California.
Pias et al., "Lighthouses for Scalable Distributed Location," 2003, 6 pages, In Proceedings of IPTPS'03.
Qiu et al., "On the Placement of Web Server Replicas," 2001, 10 pages, Proc. of IEEE INFO-COM 2001.
Sastry et al., "Buzztraq: Predicting geographical access patterns of social cascades using social networks," 2009, 7 pages, SNS'09, Mar. 31, 2009, Nuremberg, Germany.
Xu et al., "Placement Problems for Transparent Data Replication Proxy Services," Sep. 2002, 16 pages, IEEE Journal on Selected Areas in Communications, vol. 20, No. 7.
Zhang et al., "The Freshman Handbook: A Hint for the Server Placement of Social Networks," Mar. 2011, 2 pages, WWW 2011, Mar. 28-Apr. 1, 2011, Hyderabad, India.
Zhang et al., "The Freshman Handbook: A Hint for the Server Placement of Social Networks," Parallel and Distributed Systems (ICPADS) 2012 IEEE 18th International Conference on, IEEE, Dec. 17, 2012, pp. 588-595.
"Notice of Allowance" from Parent U.S. Appl. No. 13/684,125, 15 pages, mailed Mar. 5, 2015.
k-means clustering, https://en.wikipedia.org/wiki/K-means_clustering, modified on Mar. 17, 2016, pp. 1-11.
Dutt, Shantanu "New Faster Kernighan-Lin-Type Graph-Partitioning Algorithms," IEEE/ACM International conference on Computer-Aided Design, Department of Electrical Engineering, Digest of Technical Papers, Nov. 1993, pp. 1-9.

* cited by examiner

Fig. 7

Algorithm 1 K-means based Server Placement Algorithm procedure $OSN\text{-}KMEANS(G=(V,E),k)$ 1: Initialize cluster centroid $C = c_1, c_2, \cdots, c_k$
2: Assign points to closest centroid $c_i$ according to $P_i := argmin\|x_j - c_i\|^2$
3: Find new centroid $C' = c'_1, \cdots, c'_k$ to find $c'_i = \frac{1}{|P_i|}\sum_{x_j \in P_i} x_j$
4: IF $C' \neq C$
5: $C = C'$, GOTO 2
6: Compute the client to server latency between each point and its assigned centroid
7: Compute the friendship links across servers

Algorithm 2 Mincut-based Server Placement Algorithm procedure $OSN\text{-}MINCUT(G=(V,E),k)$ 1: Initialize bisection partition $\mathcal{P} = \{C_1, C_2\}$
2: repeat
3:   for any pair of unmarked $(v_1 \in C_1, v_2 \in C_2)$ do
4:     compute $h(v_1, v_2) = h(v_1) + h(v_2) - 2w(v_1, v_2)$
5:   end for
6:   Find $(v_1, v_2) = argmax\ h(v_1, v_2)$: swap and mark $v_1, v_2$
7: until $\forall v_1, v_2, h(v_1, v_2) < 0$ —— $iter = ITER_{max}$ —— all nodes marked
8: if $k > 2$ then
9:   $OSN\text{-}MINCUT(G_1=(C_1,E_1), k-1)$
10:   $OSN\text{-}MINCUT(G_2=(C_2,E_2), k-2)$
11: end if

Algorithm 3 Multi-objective Server Placement Algorithm procedure $OSN\text{-}MULTI(G=(V,E),k)$ 1: $\mathcal{P} \leftarrow OSN\text{-}KMEANS(G,k)$
2: for every pair of clusters $C_1, C_2 \in \mathcal{P}$ with centroids $c_1, c_2$ do
3:   repeat
4:     for any pair of unmarked $(v_1 \in C_1, v_2 \in C_2)$ do
5:       compute $h(v_1, v_2) = h(v_1) + h(v_2) - 2w(v_1, v_2)$
6:     end for
7:     Find $(v_1, v_2) = argmax\ h(v_1, v_2)$ and $dist(v_1, c_2) < D_{max}$ and $dist(v_2, c_1) < D_{max}$: swap and mark $v_1, v_2$
8:   until $\forall v_1, v_2, h(v_1, v_2) < 0$ —— $iter = ITER_{max}$ —— all nodes marked
9: end for

```
ACQUIRING GEOGRAPHIC INFORMATION FOR A PLURALITY OF USERS OF A SET OF ONE OR MORE
NETWORKS, WHEREIN THE GEOGRAPHIC INFORMATION FOR EACH OF THE PLURALITY OF USERS INDICATES
A GEOGRAPHIC LOCATION OF THAT USER 802
```

↓

```
ACQUIRING RELATIONSHIP INFORMATION FOR AT LEAST SOME OF THE PLURALITY OF USERS, WHEREIN THE
RELATIONSHIP INFORMATION INDICATES THOSE OF THE PLURALITY OF USERS THAT ARE CONNECTED ON A
NETWORK OF THE SET OF NETWORKS 804
```

↓

```
TRANSFORMING THE GEOGRAPHIC INFORMATION AND THE RELATIONSHIP INFORMATION INTO A GRAPH
INCLUDING A PLURALITY OF NODES REPRESENTING THE PLURALITY OF USERS AND A PLURALITY OF EDGES
CONNECTING THE PLURALITY OF NODES ACCORDING TO THE RELATIONSHIP INFORMATION, WHEREIN EACH
OF THE PLURALITY OF EDGES INCLUDES AN EDGE WEIGHT 806
```

↓

```
GENERATING A FIRST PLURALITY OF CLUSTERS BY PERFORMING A FIRST CLUSTERING ALGORITHM ON THE
GRAPH, WHEREIN EACH CLUSTER OF THE FIRST PLURALITY OF CLUSTERS INCLUDES A CENTROID AND A SET
OF ONE OR MORE NODES OF THE PLURALITY OF NODES, WHEREIN EACH OF THE SET OF NODES IS
INCLUDED IN ONLY ONE OF THE FIRST PLURALITY OF CLUSTERS 808
```

↓

```
GENERATING A SECOND PLURALITY OF CLUSTERS BY PERFORMING A SECOND CLUSTERING ALGORITHM
COMPRISING, (1) ITERATIVELY E1MINING PAIRS OF CLUSTERS OF THE FIRST PLURALITY OF CLUSTERS, AND (2) FOR EACH E1MINED PAIR OF CLUSTERS, REPEATEDLY SWAPPING PAIRS OF NODES BETWEEN THE PAIR
OF CLUSTERS WHEN A SWAP OF A PAIR OF NODES WILL:

(A) REDUCE TOTAL A CUT WEIGHT OF THE GRAPH, WHEREIN THE TOTAL CUT WEIGHT IS A SUM OF EDGE
WEIGHTS OF EDGES THAT CONNECT NODES IN DIFFERENT CLUSTERS, AND (B) LOCATE EACH NODE OF THE PAIR OF NODES, WHEN SWAPPED TO THE OTHER CLUSTER OF THE E1MINED
PAIR OF CLUSTERS, WITHIN A DEFINED MAXIMUM DISTANCE FROM THE CENTROID OF THE OTHER CLUSTER
TO THEREBY BOUND USER-TO-SERVER LATENCY 810
```

↓

```
CAUSING INFORMATION DESCRIBING GEOGRAPHIC LOCATIONS OF CENTROIDS OF THE SECOND PLURALITY
OF CLUSTERS TO BE PRESENTED TO A USER AS THE PLURALITY OF RECOMMENDED GEOGRAPHIC SERVER
LOCATIONS 812
```

MULTI-OBJECTIVE SERVER PLACEMENT DETERMINATION

CROSS-REFERENCE TO RELATED APPLICATIONS

This application is a continuation of application Ser. No. 13/684,125, filed Nov. 21, 2012, which is hereby incorporated by reference.

FIELD

Embodiments of the invention relate to the field of networking; and more specifically, to the determination of recommended geographic server locations based upon characteristics of existing networks.

BACKGROUND

A social network is a set of people (or organizations or other social entities) connected by a set of social relationships, such as friendship, co-working or information exchange relationship. There has been a recent unprecedented increase in the use of Online Social Networks (OSNs) to expand our social life, such as finding others of a common interest, discussing and sharing information in forums, and exchanging photos and personal news. The OSNs have become a large-scale distributed system providing services to hundreds of millions of users and delivering messages at very high rate.

Besides handling traditional client-to-server requests, OSNs also need to handle highly interconnected data due to the strong community structure and human relationships among their end users, which often results in complex data sharing among users. Given the tremendous user population and frequent data access by these users, effective resource planning and provisioning strategies are of extreme importance to the performance and revenue of an OSN. In particular, selecting the most suitable locations to deploy server farms is one of the key steps in such resource management.

The development of placement strategies for resources including servers and bandwidth affects the performance of any online web services. An appropriate allocation of resources benefits content providers by reducing latency for their clients and balancing the bandwidth consumption. The goal is to provide content distribution to clients with good Quality of Service (QoS) while retaining efficient and balanced resource consumption of the underlying network infrastructure. Thus, existing server placement proposals mainly focus on minimizing the average latency between the server and the users, given the nature of client/server communication patterns in traditional web services.

Many proposals on the server placement problem rely on extracting clients' requests from history traces collected on the web servers, and then searching for the best placement given the particular client and load distribution. While these proposals might be plausible in improving performance of existing OSN services, these proposals are less helpful to new OSNs that are starting afresh. Thus, a problem arises in that it is difficult for a new born Internet application service to make a decision on where to deploy its servers.

Moreover, much existing work on server placement casts the problem as an integer linear program where a binary decision variable $b_{ij}$ is used to denote if user i is assigned to server j; and the total number of selected servers should be a predetermined input M. One of the best known approximation algorithms for this problem (presented by M. Charikar and S. Guha in "Improved combinatorial algorithms for the facility location and k-median problems" in Proceedings of the 40$^{th}$ Annual Symposium on Foundations of Computer Science, 1999) achieves a very large time complexity of $O((N+P)^3)$, where N is the number of servers and P is the number of users. To make the problem more manageable in reality, a number of approximation and heuristics have been proposed such as the use of a greedy algorithm (by L. Qiu, V. N. Padmanabhan, and G. M. Voelker, in "On the Placement of Web Server Replicas," in Proc. of IEEE INFOCOM 2001, 1587-1596). However, these approaches are mainly based on theoretical analysis and are only validated using simulation in very small graphs. Further, such methods have fundamental issues in scaling to a large value of N. Accordingly, there is a need for methods to efficiently and flexibly determine, for existing or new OSNs and any value of N, where to place servers.

SUMMARY

According to one embodiment of the invention, a computer implemented method is described to determine a plurality of recommended geographic server locations by attempting to minimize both user-server latency and a latency of inter-user communications. The method includes acquiring geographic information for a plurality of users of a set of one or more networks. The geographic information for each of the plurality of users indicates a geographic location of that user. The method also includes acquiring relationship information for at least some of the plurality of users. The relationship information indicates those of the plurality of users that are connected on a network of the set of networks. Next, the method includes transforming the geographic information and the relationship information into a graph including a plurality of nodes representing the plurality of users, and a plurality of edges connecting the plurality of nodes according to the relationship information. Each of the plurality of edges includes an edge weight. The method further includes generating a first plurality of clusters by performing a first clustering algorithm on the graph. Each cluster of the first plurality of clusters includes a centroid and a set of one or more nodes of the plurality of nodes. Each of the set of nodes is included in only one of the first plurality of clusters. The method further includes generating a second plurality of clusters by performing a second clustering algorithm. The second clustering algorithm includes iteratively examining pairs of clusters of the first plurality of clusters. Then, for each examined pair of clusters, the second clustering algorithm repeatedly swaps pairs of nodes between the pair of clusters when a swap of a pair of nodes will reduce a total cut weight of the graph, and locate each node of the pair of nodes, when swapped to the other cluster of the examined pair of clusters, within a defined maximum distance from the centroid of the other cluster to thereby bound user-to-server latency. The total cut weight is a sum of edge weights of edges that connect nodes in different clusters. The method further includes causing information describing geographic locations of centroids of the second plurality of clusters to be presented to a user as the plurality of recommended geographic server locations.

According to another embodiment of the invention, a computer implemented method is described to determine a plurality of recommended geographic server locations by attempting to minimize both user-server latency and a latency of inter-user communications using a joint analysis approach based upon characteristics of a plurality of networks. The method includes acquiring geographic information for a plurality of users of the plurality of networks. The geographic information for a user of the plurality of users indicates a geographic location of the user. The method also includes acquiring relationship information for at least some of the plurality of users. The relationship information indicates those of the plurality of users that are connected on at least one of the plurality of networks. The method further includes transforming the geographic information and the relationship information into a plurality of graphs. Each graph of the plurality of graphs represents one network of the plurality of networks. Each graph of the plurality of graphs includes a plurality of nodes representing those users of the plurality of users that belong to the one network, and a plurality of edges connecting the plurality of nodes according to the relationship information. Each of the plurality of edges includes an edge weight. The method also includes generating, for each graph of the plurality of graphs, a plurality of clusters for that graph by performing a clustering algorithm. Each of the plurality of clusters includes a centroid. The method further includes identifying a first recommended geographic server location by ranking a set of centroids according to the frequency of occurrence of each centroid in the set of centroids (where the set of centroids includes all of the centroids of the plurality of clusters of each of the plurality of graphs), and identifying a centroid of the ranked set of centroids having the highest occurrence as representing the first recommended geographic server location.

In an embodiment of the invention, a server end station is described that is configured to determine a plurality of recommended geographic server locations by attempting to minimize both user-server latency and a latency of inter-user communications. The server end station includes an information acquisition module. The information acquisition module is configured to acquire geographic information for a plurality of users of a set of one or more networks. The geographic information for each user of the plurality of users indicates a geographic location of that user. The information acquisition module is also configured to acquire relationship information for at least some of the plurality of users. The relationship information indicates those of the plurality of users that are connected on at least one network of the set of networks. The server end station also includes a transformation module configured to transform the geographic information and the relationship information into a graph including a plurality of nodes representing the plurality of users and a plurality of edges connecting the plurality of nodes according to the relationship information. Each of the plurality of edges includes an edge weight. The server end station also includes a server placement module. The server placement module is configured to generate a first plurality of clusters by performing a first clustering algorithm on the graph. Each cluster of the first plurality of clusters includes a centroid and a set of one or more nodes of the plurality of nodes. Each node of the set of nodes is included in only one cluster of the first plurality of clusters. The server placement module is further configured to generate a second plurality of clusters by performing a second clustering algorithm. The second clustering algorithm includes iteratively examining pairs of clusters of the first plurality of clusters. The second clustering algorithm also includes for each examined pair of clusters, repeatedly swapping pairs of nodes between the pair of clusters when a swap of a pair of nodes will reduce a total cut weight of the graph (wherein the total cut weight is a sum of edge weights of edges that connect nodes in different clusters) and locate each node of the pair of nodes, when swapped to the other cluster of the examined pair of clusters, within a defined maximum distance from the centroid of the other cluster to thereby bound user-server latency. The server end station further includes a presentation module configured to cause information describing geographic locations of centroids of the second plurality of clusters to be presented to a user as the plurality of recommended geographic server locations.

BRIEF DESCRIPTION OF THE DRAWINGS

The invention may best be understood by referring to the following description and accompanying drawings that are used to illustrate embodiments of the invention. In the drawings:

FIG. 7 illustrates three server placement algorithms according to one embodiment of the invention;

FIG. 8 illustrates a flow for determining a plurality of recommended geographic server locations by attempting to minimize both user-server latency and a latency of inter-user communications according to one embodiment of the invention.

DESCRIPTION OF EMBODIMENTS

Figure 1:
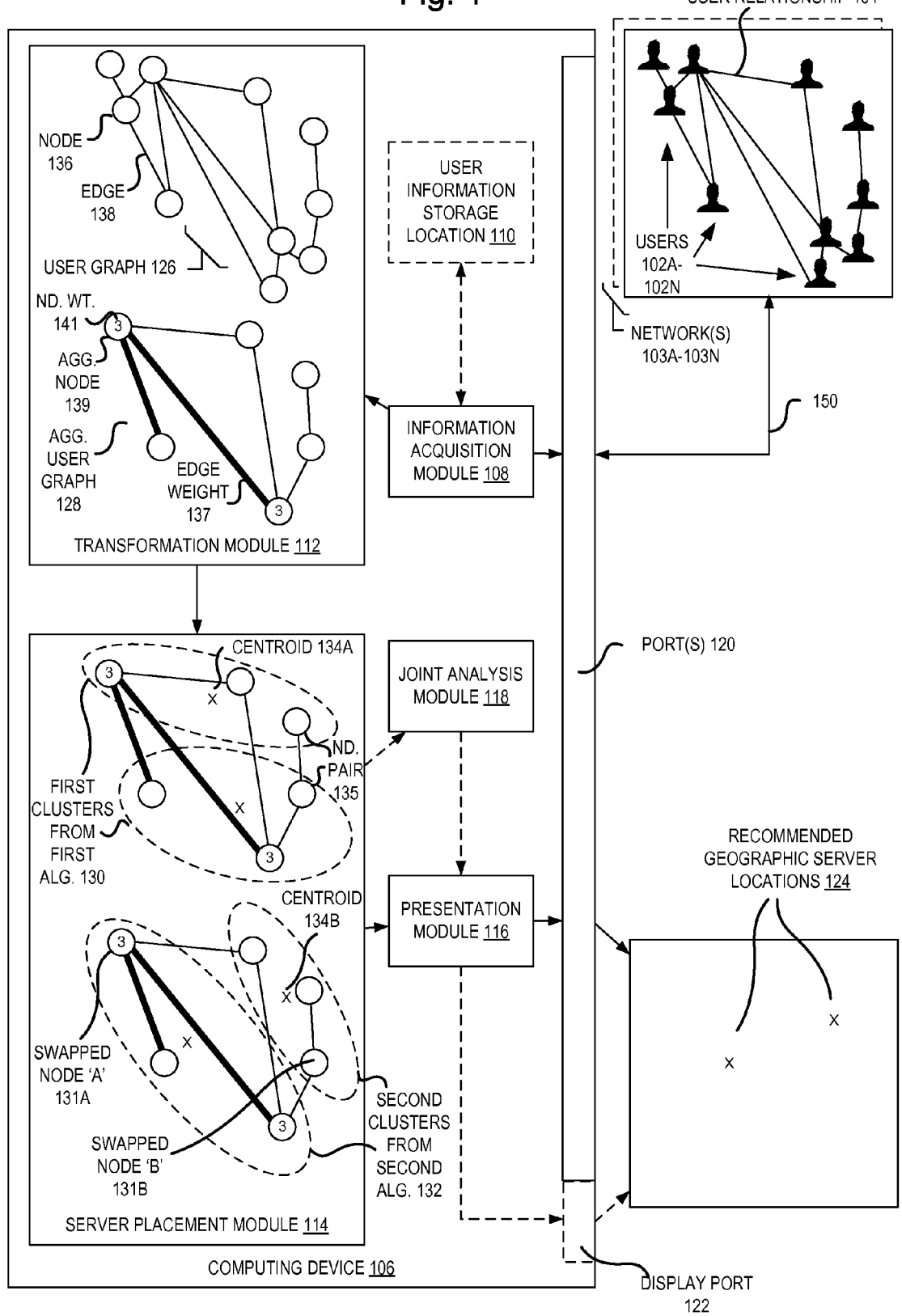
FIG. 1 illustrates a system for determining a plurality of recommended geographic server locations using multiple objectives according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network element, a computer/computing system/computing device) stores and transmits (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a mouse, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Subscriber end stations are computing devices (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) that access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

An online social network (OSN) is an online service, platform, or website that facilitates the building of social networks or social relations among its users. Some OSNs are general purpose and provide social networking services for a wide variety of users, while others provide such services for users having particular interests, such as users with common hobbies, activities, backgrounds, or real-life connections. OSNs often include a representation of each user (often a profile, including biographic data, photographs, and other information) and a set of his/her social links (e.g. connections to other users, organizations, entities, etc.). Many OSNs are web-based and provide means for users to interact through the use of computing devices and the Internet. Certain embodiments of the invention described herein involve server placement for OSNs; however, other embodiments of the invention apply to server placement for other scenarios such as networks of users, including but not limited to users of a cellular network, wired network, wireless network, etc.

Embodiments of the invention utilize a scalable server placement algorithm based upon graph partitioning. Some embodiments employ clustering techniques that partition the whole client space into non-overlapping groups (or clusters) according to a dual purpose, wherein user locations in a cluster are both topologically close to the centroid of the cluster (i.e. which indicate the best suitable locations to minimize user-to-server latency) and wherein each centroid is topologically close to other centroids (i.e. which indicate the best suitable locations to minimize server-to-server latency). Embodiments of the invention, in implementing the scalable server placement algorithm, take inter-user data sharing/communication into consideration. Some embodiments also utilize publicly available social network data to make better resource provisioning decisions for social networks that do not currently exist.

Embodiments of the invention help improve the performance and reduce operational costs of future (i.e. not yet existing) as well we current online social network services. Use of the invention may also reduce energy consumption and carbon emission of such services, especially at their hosting data centers and the communication networks, and help make better usage of computing resources and preserve natural resources.

Although there has been some research into server placement algorithms, the following three challenges have been unsolved by any existing work. First, existing work has not been computationally scalable to accommodate the selection of any number of server locations. Most existing work formulates the server placement as a facility location problem: choosing M replicas among N potential sites (N>M) such that some objective function is optimized under a given traffic pattern. However, the assumption of having a candidate pool, i.e., N potential sites, may not hold in reality. Especially with the growth of cloud computing, platform and data centers, the choices of hosting resources are becoming more and more pervasive. Further, telecommunications companies have started building their own cloud computing platforms. Under the emerging trend of available computing resources in cloud platforms, the cost for web providers has been significantly reduced while the server selection range has an order of magnitude increase. Moreover, most of the solutions do not scale well with the number of server candidates or the number of clients. Existing work that relies upon optimization software to find a feasible solution can only handle thousands of nodes at most. Thus, the effectiveness and the accuracy of such solutions are inherently limited by the candidate sets.

Second, existing work has not considered inter-user data sharing. In OSNs, communications are more complex than in traditional flat client-server scenarios, as they include reads and writes across particular users, such as the writing/reading of a friend's user profile page, which is dubbed "inter-user access to shared data." The performance of such communication is as important as the client/server access, and is not accounted for in most server placement algorithms. The user experience is degraded if updates to shared data are not quickly reflected to other clients. Moreover, the inter-user communications include users scattered worldwide, contributing another factor to consider in server selection. Besides the concerns on the user perceived performance, data sharing may also have impact on the OSN operational cost. Data sharing between users in different locations can introduce significant network bandwidth cost to the OSN providers. For example, updating a user profile for one user may trigger notifications to be sent to multiple other users. In this case, the subscriptions between connected users triggers the data transfer among storage entities within the OSN. When these servers reside in different sites, the traffic will have to traverse the Internet, causing additional inter-site network consumption and/or congestion, delay, and additional bandwidth cost. When selecting servers to minimize cost, such a factor should be taken into consideration. Therefore, these connections fundamentally transform the problem's mathematics: in addition to connections between clients and the servers to store their data, there are connections in the communication graph between users' data.

Finally, existing approaches to server selection do not consider the fact that, for a new network service (such as an OSN), there is not any available server data to harvest when making decisions. However, new OSN operators need to make the decision of where to place the servers even before the system is in production. No existing work has specified how to solve this forecasting problem.

Certainly there are many different factors causing diverse user distribution, request patterns and inter-user data sharing. However, OSNs are believed to reflect the real-life social relationships of people. Therefore, there are some factors that have been common among most OSNs. Users may be connected (i.e. have a "relationship") based on one relation only, e.g., as members of the same organization. Alternatively, users may maintain a multiplex tie based on many relations, such as sharing information, giving financial support and attending conferences together. These ties reflect the real-life social relationships of people and person-to-person interaction. Moreover, a person's social personality is likely to stay consistent across communities and environments. For instance, a user who is active in one social network is likely to be active in another.

Embodiments of the invention utilize public information from existing, established Online Social Networks (OSNs), which provides sufficient information to provide intelligent server placement suggestions to new born social network applications.

Embodiments of the invention utilize a solution that is formulated as an optimization problem of minimizing a number of required replicas. For this purpose, we use the following notation. Let G=(V, E) denote the social graph of an OSN, with node set V representing users, and edge set E representing friendship relationships among users. In an embodiment, social graph G is an undirected symmetric graph with weighted edges, i.e., if (u, v)∈E, then (v, u)∈E. Each edge is associated with a weight $w_{i,j}$ representing the number of relationship between user u and v. Thus, $w_{i,j}=1$ if the two nodes stand for a single user. If each node in G represents a group of users, $w_{i,j}$ is the number of pairwise friendships between this group of users. The objective is to find a subset M of the locations from all candidate nodes N=|V|, and connect each user to the server so that the total cost is minimized.

To support the scalability with a large N value, embodiments of the invention solve the problem as a graph partitioning or clustering problem. A clustering of a graph is a partition P of V, which includes a set of clusters $C_0, C_1, \ldots, C_k$—i.e., ⋈i, j: $C_i \cap C_j = \Pi$, and $C_0 \cup C_1 \cup \ldots \cup C_k = V$. A cost function $f$ assigns a real number to any given clustering of G. The goal is to find a clustering that minimizes a given cost function. For instance, the cost function could be the sum of the distance between each node and its centroid, or it could be the negative sum of edge weights between clusters. Two common ways to partition a graph include using an agglomerative approach, which initializes each element to belong to its own cluster and proceeds to merge clusters until a certain terminating condition is met, and using a partitive clustering approach that starts with a single cluster containing all elements and proceeds by splitting clusters.

Embodiments of the invention utilize graph partitioning processes that include optimizing for multiple objectives. Multi-objective optimization problems are minimization problems that work with a set of cost functions $F=(f_1, f_2, \ldots, f_n)$. The goal is to find the set S of Pareto-optimal solutions. Embodiments of the invention define two objectives to capture both latency and inter-site traffic cost, although in other embodiments these formations can be easily modified to account for other types of performance metrics and costs.

In embodiments, the center of any cluster "C" is defined as the following, where v is used to enumerate all nodes in the cluster:

$$\text{Centroid}(C) = \frac{1}{|C|} * \sum_{v \in C} v$$

Figures 5, 6:
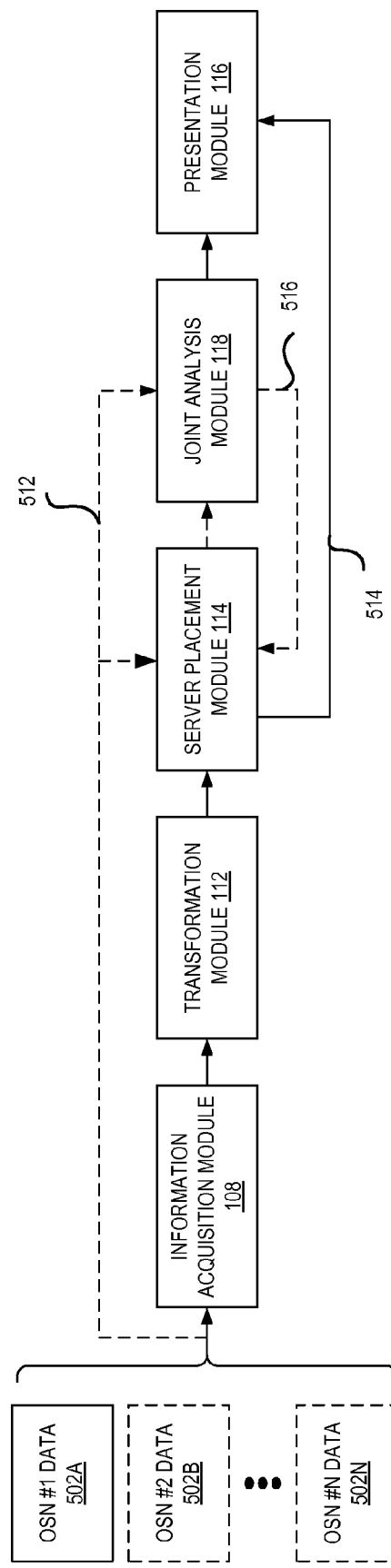
FIG. 5 illustrates a high-level view of an approach for determining a plurality of recommended server locations according to one embodiment of the invention.
FIG. 6 illustrates two possible cost functions useful in particular clustering algorithms according to one embodiment of the invention.

To satisfy the requirements for OSN server placements, embodiments of the invention utilize one or more of the two cost functions, which are detailed in FIG. 6. First is an intra-cluster latency cost function 602:

$$f = \Sigma_{C \in P} \Sigma_{u \in C} \text{dist}(u, \text{centroid}(C))$$

Second is an inter-cluster traffic cost function 604:

$$g = -\frac{1}{|V|} \sum_{u \in V} \frac{1}{h} \sum_{j=1} \delta(u, nei_{uj})$$

In the above functions, P is a given partition solution, and dist(u, v) is the weight of edge (u, v), which is defined to be the user-to-centroid latency. In the inter-cluster traffic cost function 604, $nei_{uj}$ is defined as node u's most connected $j^{th}$ neighbor according to the definition of connections among users. The value j is used to enumerate all of u's neighbors. The value δ(u, v) is a binary variable to denote if u and v are in the same partition. Note that the inter-cluster traffic cost function 604 "g" measures inter-cluster connectivity to be minimized, while intra-cluster latency cost function 602 "f" measures intra-cluster difference, which should also be minimized. Taken together, they do not favor trivial clusterings where all nodes are assigned to the same cluster, or each node is assigned to its own cluster. While this description focuses upon the above two objective functions 602, 604, in other embodiments the functions are modified to describe other cost functions such as energy bills, cooling spending, and infrastructure leasing costs, thereby allowing for such costs to also be considered.

FIG. 1 illustrates a system for determining a plurality of recommended geographic server locations using multiple objectives according to one embodiment of the invention. This system represents one embodiment of the invention that implements the general process depicted in FIG. 5, which illustrates a high-level view of an approach for determining a plurality of recommended server locations. From this high-level view of one embodiment, data from one or more OSNs (502A-502N) is acquired by an information acquisition module 108 using a set of ports 120 (e.g. physical network interfaces) and transformed into one or more graphs by a transformation module 112. Next, a server placement module 114, which utilizes one or more clustering algorithms (highlighted above) to cluster the graphs, which may generate one or more recommended geographic server locations based upon the clustering. Following 514, a presentation module 116 may display the results to a user or transmit the results so that a user is so informed. In embodiments, this transmission is one or more of transmitting the results to a display, transmitting the results to a separate device for viewing or further processing, or transmitting the results to another device (e.g., a printer) to create a physical document or element. In other embodiments, the presentation module 116 is enabled to automatically or semi-automatically reserve or allocate server resources at the recommended geographic server locations, such as by enabling one or more virtual machine and/or network instances at or near the recommended geographic server locations. Instead of following line 514 to the presentation module 116, the process may also continue to a joint analysis module 118 configured to utilize data from multiple OSNs when determining recommended geographic server locations. In some embodiments, the joint analysis module 118 may include functionalities of transformation module 112 or server placement module 114, which will allow the joint analysis module 118 to generate its own results, which are shifted to the presentation module 116. However, following 516, the joint analysis module 118 may cause the server placement module 114 to be used again. In some embodiments, the joint analysis module 118 or server placement module 114 may immediately (see line 512) be invoked with OSN data (502A-102N). This may occur, in some embodiments, using OSN data (502A-102N) stored by a user information storage location 110 of a computing device 106, as depicted in FIG. 1.

Turning back to FIG. 1, an information acquisition module 108 of the computing device 106 acquires 150 information about a plurality of users 102A-102N and user relationships 104 of one or more networks 103A-103N. In an embodiment, the networks 103A-103N are OSNs. In an embodiment, this acquired information includes a set of user profiles from the OSNs, as well as a list of other users with whom each user has relationships with on the network (i.e. "friends" of each user, or some other designation of connected users). In embodiments of the invention, the acquired information is maintained in a user information storage location 110 of the computing device 106.

In embodiments of the invention, the transformation module 112 attempts to deduce a geographic location from the user profile for each user (e.g. 102A). Many users explicitly register their current location with the network, while many users enter their birth location, and yet others enter affiliations that reveal a user geographic location. Interestingly, a non-trivial fraction of users' locations are automatically entered by the smart phone applications in the form of longitude and latitude. In an embodiment, the transformation module 112 first retrieves all possible hints on location from the crawled data. The transformation module 112 may then pre-process the crawled data to correct typographical errors, eliminate ambiguity, and combine any same location having multiple representations into one (e.g., "California" and "CA" and "Cal."). In an embodiment, the transformation module 112 then translates the user location strings into latitude-longitude coordinates using a geocoding database (internal or external to the computing device 106) or a geocoding API, including but not limited to APIs such as the Google Geocoding API or the Yahoo! Maps Web Services Geocoding API.

In an embodiment, the acquired information and the deduced geographic coordinates are transformed by the transformation module 112 into a user graph 126 having a plurality of nodes 136 and a plurality of edges 138 connecting some of those nodes. In an embodiment, the location of each node 136 is based upon the deduced geographic coordinates of the users, and the edges 138 exist between any two nodes 136 that represent users that have a connection on the OSN or OSNs (based upon the acquired user relationship 104 data).

In an embodiment, a latency map is constructed between any pair of users. While in one embodiment, each latency value is a round-trip delays collected for all users. However, in many embodiments due to limited access to end hosts at a large scale, a hypothetical direct link latency is calculated to approximate the latency between two users using the deduced geographic locations. Thus, in an embodiment, the latency between two users is the transmission latency of a hypothetical direct link (e.g. optical, metallic) between those users. In an embodiment, locations are treated as points and are clustered into regions using the well-known Vincenty's formula, which is used to calculate geodesic distances between points. (Except for networks that use circuit-switching, geographic distance correlates well with the minimum network delay. This method is more robust than extracting link latencies from trace-route data; such latencies can be contaminated by network queuing and unknown asymmetric reverse path delay.)

In an embodiment, representing each individual user as one node 136 in the user graph 126 would result in tremendously huge graph. Moreover, users physically near each other will share similar network topological properties. Therefore, in an embodiment of the invention users are aggregated to groups to form an aggregated user graph 128. In an embodiment, users located within a range of latitude and longitude from each other (e.g., within 2 degrees of latitude and longitude) are grouped together as one aggregated node 139. Such aggregation has a much finer granularity than performing grouping based on cities or even zip codes. Accordingly, in an embodiment a node weight 141 is assigned to each node (e.g. 139) based upon the number of users in the group represented by the node 139. In the depicted example of FIG. 1, the top left aggregated node 139 contains a node weight 141 of '3' because there are three nodes from the original user graph 126 that were located within a particular distance of each other and thus were aggregated together. In an embodiment, an edge weight 137 is assigned to an edge that represents the total number of relationships (e.g. friendship connections) between users in the two connected groups. These weights are represented in FIG. 1 using thick lines (for heavier comparative weights) or thin lines (for lighter/smaller comparative weights), but in embodiments of the invention the weights are integers, real numbers, binary values, or the like.

After the aggregated user graph 128 is constructed by the transformation module 112, the server placement module 114 utilizes the aggregated user graph 128 to determine recommended geographic server locations 124 using a variety of placement algorithms. While in one embodiment an ultimate goal is to minimize user-to-server latency and a latency of inter-user communications simultaneously, the following description presents three separate algorithms for determining the recommended geographic server locations 124, which may be more suited for certain applications based upon the constraints and preferences involved: one algorithm for minimizing user-to-server latency 702, one algorithm for minimizing a latency of inter-user communications 704, and one algorithm to optimize for both 706.

FIG. 7 illustrates these three server placement algorithms according to one embodiment of the invention. In an embodiment, the server placement module 114 is configured to utilize an algorithm for primarily minimizing user-to-server latency 702. In an embodiment, the algorithm 702 is based upon a k-means or k-medoids clustering algorithm, but with several enhancements. The algorithm 702 is reproduced below:

---
procedure OSN-KMEANS (G=(V,E),k)
1:   Initialize cluster centroid C = $c_1, c_2, \ldots, c_k$
2:   Assign points to closest centroid $c_i$ according to $P_i$ := argmin $\|x_j - c_i\|^2$ 3:   
  Find new centroid $C' = c'_1, \ldots, c'_k$ to find $c'i = \frac{1}{|Pi|} \sum_{x_j \in Pi} x_j$ 4:   IF C' ≠ C
5:   C = C', GOTO 2
6:   Compute the client to server latency between each point and its assigned centroid
7:   Compute the friendship links across servers
---

To summarize, the server placement module 114 begins with k elements as the centroid. In an embodiment, the value of k is selected by the user to signify the number of recommended geographic server locations 124 that are sought by the user. With the centroids selected, the server placement module 114 iteratively selects a new centroid to minimize the distance between samples in the same group to the centroid of the group. Given a centroid of cluster $C_i$, all the points $U_j$ belonging to this cluster are computed with center $c_i$ in step 2. At step 3, the server placement module 114 re-computes the new center C' for each cluster $P_i$ according to the new grouping of $x_j$. The complexity of this algorithm is $O(nk\lambda)$, where k is the final number of clusters, n is the total data points, and $\lambda$ is the number of iterations.

In an embodiment, the value $\lambda$ has been significantly reduced through a careful selection of k and the initial set based on realistic conditions. Note that the server placement module 114 doesn't simply apply the classic k-means or k-medoids style clustering solutions blindly, but carefully selects the initial sets according to our problem context. In an embodiment, the server placement module 114 starts the selection of known data center locations of popular OSNs and uses them as the initial candidates (i.e. centroids) for the algorithm, which efficiently reduces the number of iterations of clustering. Additionally, in an embodiment, for each k, the server placement module 114 always includes the set of servers selected in the k−1 experiment in the initial set. The remaining is selected based on ranking of user population. Moreover, in an embodiment the algorithm takes the sample density information (e.g., the weights) into consideration, instead of treating each data point as equivalent.

In an embodiment, the server placement module 114 is configured to utilize an algorithm for primarily minimizing a latency (or, an average latency) of inter-user communications 704. Intuitively, if graph edges represent relationships between vertices, then a goal is to achieve many edges within clusters and few edges between clusters. However, if the cost function is set to be the number of inter-cluster edges, then the problem of minimizing it is trivial, i.e., picking the clustering that contains a single cluster. Thus, in addition to the minimum cut requirement, the algorithm 704 requires that the partition needs to be as balanced as possible. The balance property can also help providing balanced load and best resource utilization. For example, if one best location is used to serve all the users, it may easily create bandwidth bottlenecks. In the following description, the terms "cuts", "inter-cluster edges" and "inter-site traffic" are utilized interchangeably.

In an embodiment, the algorithm 704 is based upon a minimum-cut clustering algorithm with modifications. The algorithm 704 is reproduced below:

---
procedure OSN-MINCUT (G=(V,E),k)
1: Initialize bisection partition P = $\{C_1, C_2\}$
2: repeat
3: for any pair of unmarked ($v_1 \in C_1$; $v_2 \in C_2$) do
4:   compute $h(v_1, v_2) = h(v_1) + h(v_2) - 2w(v_1, v_2)$
5: end for
6: Find $(v_1, v_2)$ = argmax $h(v_1, v_2)$: swap and mark $v_1, v_2$
7: until $\forall v_1, v_2, h(v_1; v_2) < 0$—iter=$ITER_{max}$—all nodes marked
8: if k > 2 then
9:   OSN-MINCUT($G_1=(C_1, E_1)$, k − 1)
10:  OSN-MINCUT($G_2=(C_2, E_2)$, k − 2)
11: end if
---

Given an initial bisection, the server placement module 114 searches to find a sequence of node pair exchanges that leads to an improvement of the cut size. For example, Let $C_1, C_2$ be the bisection of graph G=(V,E)—i.e., $C_1 \cup C_2 = V$ and $C_1 \cap C_2 = \emptyset$. For each v∈N, the server placement module 114 defines int(v)=$\Sigma_{(v,u) \in E \& P(v)=P(u)} \omega(v, u)$ and ext(v)=$\Sigma_{(v,u) \in E \& P(v) \ne P(u)} \omega(v, u)$. The server placement module 114 defines the gain of moving edge v to a different partition to be h(v)=ext(v)−int(v). During each iteration, the server placement module 114 finds the best pair of nodes $v_1 \in C1$ and $v_2 \in C2$ to exchange to maximize the gain. In an embodiment, the server placement module 114 executes this procedure recursively until no further gain can be obtained by changing any pairs of nodes. Note that the target of the algorithm 704 is still a partitioning of k clusters. Lines 9-10 further partition the two initial two clusters $C_1$ and $C_2$, respectively. However, their targets are reduced to k−1 and k−2 accordingly.

In an embodiment, the server placement module 114 is configured to utilize an algorithm for minimizing both user-to-server latency and a latency of inter-user communications 706, which is an extension of both the algorithm for minimizing user-to-server latency 702 and the algorithm for minimizing a latency of inter-user communications 704. The algorithm 706 is reproduced below:

---
procedure OSN-MULTI(G=(V,E),k)
1: P ← OSN-KMEANS(G,k)
2: for every pair of clusters $C_1, C_2 \in P$ with centroids $c_1, c_2$ do
3:   repeat
4:     for any pair of unmarked ($v_1 \in C_1$; $v_2 \in C_2$) do
5:       compute $h(v_1, v_2) = h(v_1) + h(v_2) - 2w(v_1, v_2)$
6:     end for
7:     Find $(v_1, v_2)$ = argmax $h(v_1, v_2)$ and dist($v_1, c_2$) < Dmax and dist($v_2, c_1$) < Dmax: swap and mark $v_1, v_2$
8:   until $\forall v_1, v_2, h(v_1, v_2)$ ¡ 0—iter=$ITER_{max}$—all nodes marked
9: end for
---

In an embodiment, the server placement module 114 initializes the partition using the algorithm for minimizing user-to-server latency 702 and then iteratively switches nodes to reduce the cuts similar to that of the algorithm for minimizing a latency of inter-user communications 704. In an embodiment, to prevent resulting in large user-to-server latency during the swapping process, the server placement module 114 imposes maximum latency constraints between the centroid and the new node if the move is to be performed. While in some embodiments the algorithm 706 may finish with a local optimal solution instead of a global optimal one, given the NP hard property of the problem, the algorithm is much more efficient and scalable than other integer programming based solutions.

Turning back to FIG. 1, the server placement module 114 is depicted as configured to utilize the algorithm for minimizing both user-to-server latency and a latency of inter-user communications 706, which, in an embodiment, includes two sub-algorithms, each performing operations similar to algorithms 702 and 704. Accordingly, the server placement module 114 includes two first clusters obtained from performing the first sub-algorithm 130, which depicts two potential clusters (and centroids 134A) generated by the algorithm that attempted to minimize user-to-server latency. Then, the server placement module 114 performs the second sub-algorithm and generates another two clusters as a result 132. As described above, in an embodiment this process entails examining pairs of nodes 135 from different clusters and swapping these nodes if and only if the cut size is reduced and the distance of each swapped node is within a maximum latency constraint distance from the centroid (e.g. 134B) of the new cluster. Accordingly, this second set of clusters 132 is shows with a first swapped node 'A' 131A and a second swapped node 'B' 131B, which reveals that the swap occurred because the cut size was reduced and each node was within the maximum latency constraint distance from the centroid (e.g. 134B). In an embodiment, each centroid (e.g. 134B) of these second set of clusters from the second sub-algorithm 132 represents the recommended geographic server locations 124. In some embodiments, upon completion of the algorithm 706 by the server placement module 114, the presentation module 116 utilizes port(s) 120 to cause the recommended geographic server locations 124 to be presented to a user, but in other embodiments, the presentation module 116 utilizes a display port 122 to display the recommended geographic server locations 124 to a user on a display device. In some embodiments, the display port 122 is a physical interface of the computing device 106 used to transmit visual information to a user, either through a wired or wireless interface.

In some embodiments of the invention, the computing device 106 includes a joint analysis module 118. As depicted, the joint analysis module 118 interacts with the server placement module 114 and the presentation module 116; however, in other embodiments (not depicted) the joint analysis module 118 is used with other modules and used in a different order than that depicted.

The joint analysis module 118 allows the computing device 106 to utilize information from multiple existing OSNs in additional ways when determining recommended geographic server locations 124. One use enabled by the joint analysis module 118 is depicted in FIG. 2 and provides "joint before" analysis of OSN data, and another use enabled by the joint analysis module 118 is depicted in FIG. 3 and FIG. 4 and provides "joint after" analysis of OSN data.

Figure 2:
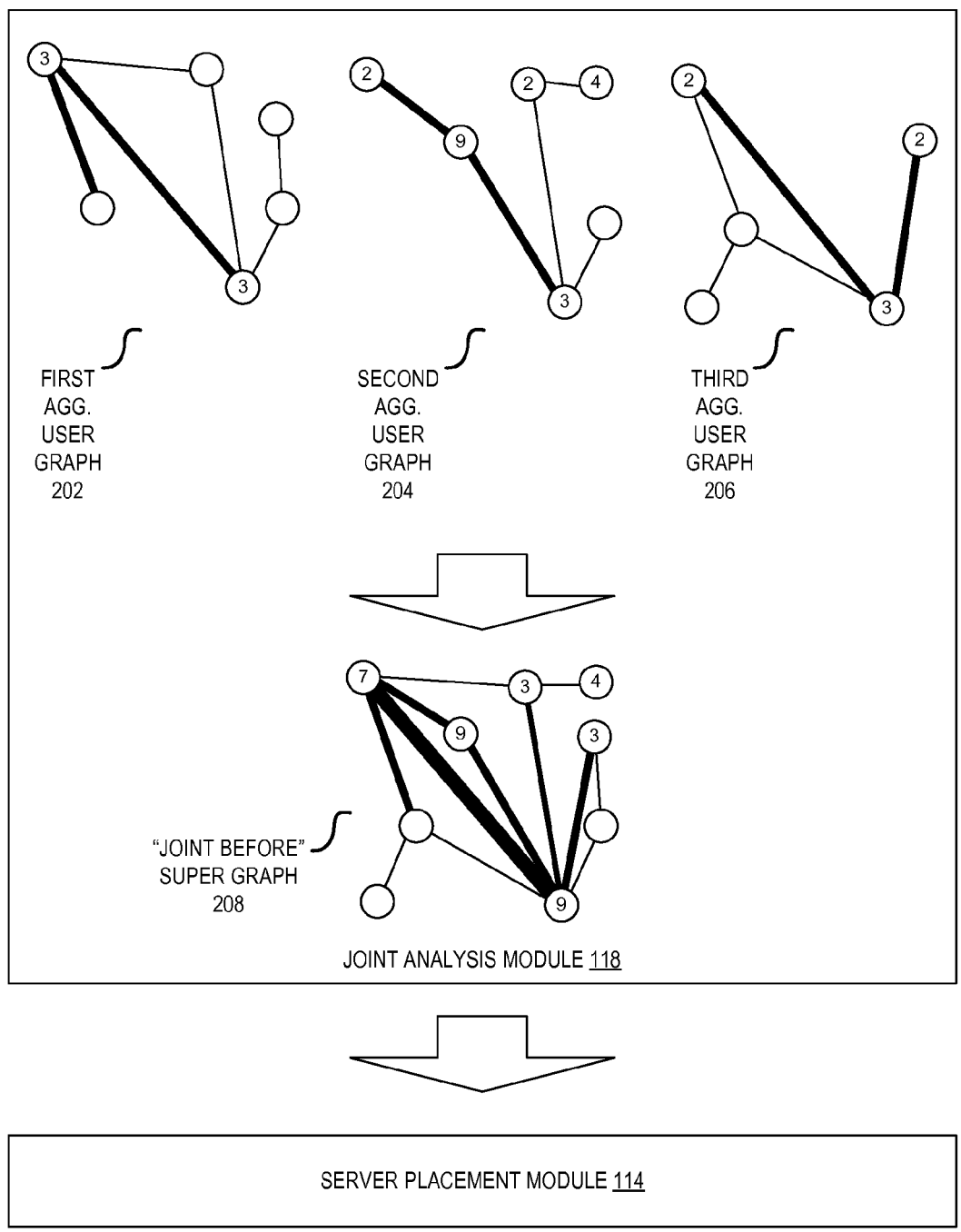
FIG. 2 illustrates a "joint before" approach for determining a plurality of recommended geographic server locations using aggregated user graphs from a plurality of networks according to one embodiment of the invention.

FIG. 2 illustrates a "joint before" approach for determining a plurality of recommended geographic server locations using aggregated user graphs from a plurality of networks according to one embodiment of the invention. In an embodiment, the joint analysis module 118 first combines all the input nodes and edges to create a super graph:
$\hat{G}=(\hat{V}, \hat{E})=\cup G_i$
where node weights:
$w_{\hat{u}}=(\Sigma_u w_u)/|\cup u|$
and edge weights:
$w_{\hat{u},\hat{v}}=(\Sigma w_{u,v}))/|\cup (u,v)|$ In FIG. 2, this is depicted as the first, second, and third aggregated user graphs (202, 204, and 206) as being combined into "joint before" super graph 208. In other embodiments, the aggregated user graphs (202, 204, and 206) are not first created; rather, individual nodes and edges from the different OSNs are added one by one to create the "joint before" super graph 208.

Then, the server placement module 114 takes $\hat{G}$ (the "joint before" super graph 208) as the input for partitioning from the joint analysis module 118.

Figure 3:
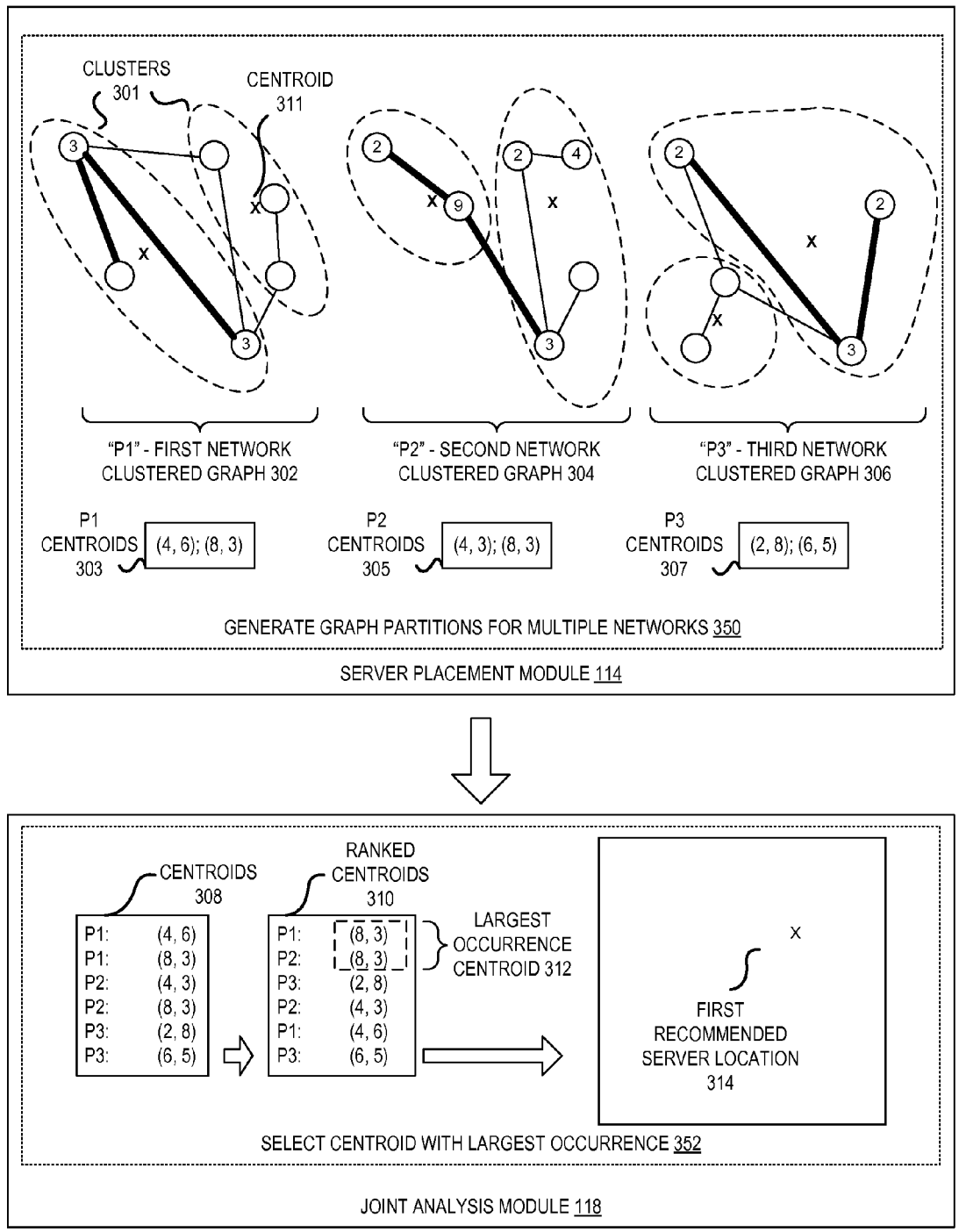
FIG. 3 illustrates portions of a "joint after" approach for determining a plurality of recommended geographic server locations using centroids from within clusters from different network graphs according to one embodiment of the invention.
Figure 4:
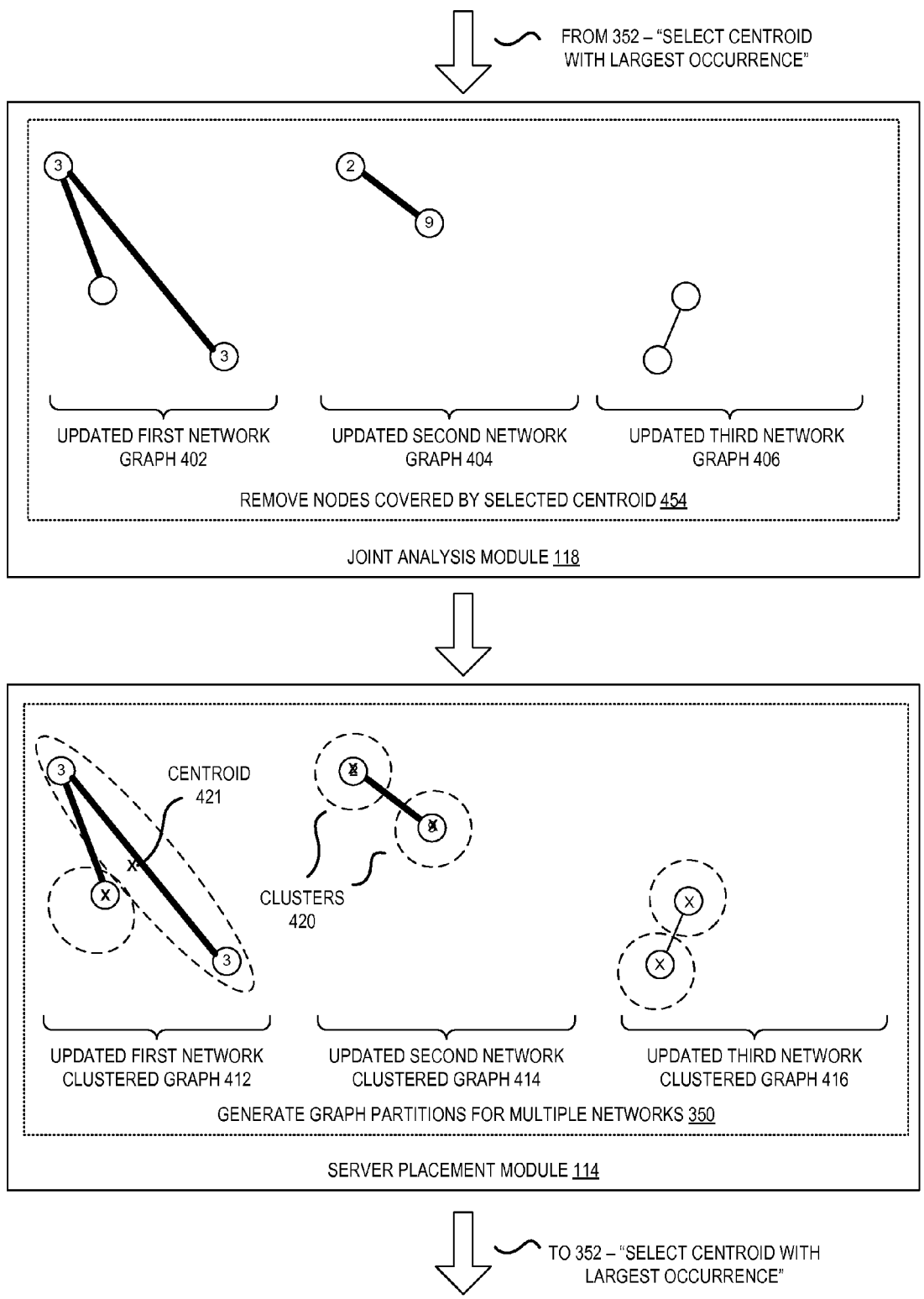
FIG. 4 illustrates additional portions of the "joint after" approach presented in FIG. 3 according to one embodiment of the invention.

FIG. 3 and FIG. 4 illustrate portions of a "joint after" approach for determining a plurality of recommended geographic server locations using centroids from within clusters from different network graphs according to one embodiment of the invention.

According to an embodiment of the invention, the "joint after" approach works as such: given the solution sets $CP=\{C_1, C_2, \ldots C_p\}$ for p OSNs, the joint analysis module 118 is configured to rank all centroids i based on their occurrence $\tau_i$ in CP, $\tau<p$. Each time, the joint analysis module 118 selects the centroid with largest $\tau$. Together, the joint analysis module 118 removes all nodes covered by that centroid, and updates the edge weights of the rest of each graph accordingly. Then, the server placement module 114 generates graph partitions again on the updated graph $G'=G-C_i$ for each OSN, and selects the next centroid based on the new solution sets. Iteratively, the computing device 106 selects k centroids as the placement for new OSNs.

For example, in an embodiment, the server placement module 114 is configured to generate graph partitions for multiple networks 350. FIG. 3 depicts this as a first, second, and third network clustered graph (302, 304, and 306). Each of these network clustered graphs includes clusters (e.g. 301) and a centroid (e.g. 311) for each cluster. Next, the server placement module 114 identifies the centroids from each networked clustered graph as 303, 305, and 307.

The joint analysis module 118 is then tasked with selecting a centroid having the largest occurrence 352. In an embodiment, the joint analysis module 118 consolidates the centroids 308 and then ranks the centroids 310 according to their occurrence. Next, the centroid with the largest occurrence 312 is selected—here, a centroid in both P1 302 and P2 304 is the same—at (8,3)—and thus is the centroid having the largest occurrence 312. This largest occurrence centroid 312 is identified as the first recommended server location 314. The coordinate or location of the centroid, depending upon the embodiment, may already represent latitude and/or longitude or another geographic indication, or it may need to be transformed from some other representation into a geographic location.

At this point, if the value of "k" was set to '1', the process would end. However, in an embodiment the process will repeat until k recommended server locations are calculated. Thus, optionally (assuming the value of "k" is larger than '1'), the process proceeds to 454 to remove nodes covered by the selected centroid. At this point, in an embodiment the joint analysis module 118 removes all nodes and edges covered by the selected centroid from each graph 302, 304, and 306 to generate updated network graphs 402, 404, 406. In an embodiment, the joint analysis module 118 is configured to remove the nodes and edges covered by the selected centroid by removing the cluster (and all nodes within) associated with the centroid from the graphs (here, removing a cluster from each updated network graph 302 and 304). For those graphs not including that centroid (e.g. 306), the cluster located closest to the selected centroid (or the cluster having a centroid located closest to the selected centroid) is removed.

Thus, the process continues with the server placement module 114 utilizing the updated network graphs 402, 404, and 406 to again generate graph partitions for the multiple networks 350. This results in new clusters (e.g., 420) and centroids (e.g. 421) being generated within the updated network graphs 412, 414, and 416. At this point, the process continues to 352 to again select the centroid with the largest occurrence to find another recommended server location. Of course, if the number of recommended server locations does not yet equal the value of k, the process will continue until they are equal.

FIG. 8 illustrates a flow 800 for determining a plurality of recommended geographic server locations by attempting to minimize both user-server latency and a latency of inter-user communications according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Moreover, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

At 802, the flow 800 includes acquiring geographic information for a set of one or more users of a set of one or more networks. The geographic information for a user of the plurality of users indicates a geographic location of the user. In an embodiment of the invention, each network of the set of networks is an online social network. At 804, relationship information is acquired for at least some of the plurality of users. The relationship information indicates those of the plurality of users that are connected on at least one network of the set of networks.

The geographic information and the relationship information are transformed into a plurality of graphs 806. Each graph of the plurality of graphs represents one network of the plurality of networks. Each of the graphs includes a plurality of nodes representing those users of the plurality of users that belong to the one network, and a plurality of edges connecting the plurality of nodes according to the relationship information. Each of the plurality of edges includes an edge weight.

Next, a first plurality of clusters is generated by performing a first clustering algorithm on the graph 808. Each cluster of the first plurality of clusters includes a centroid and a set of one or more nodes of the plurality of nodes. Each node of the set of nodes is included in only one of the first plurality of clusters.

A second plurality of clusters is generated by performing a second clustering algorithm 810. The second clustering algorithm includes iteratively examining pairs of clusters of the first plurality of clusters. The second clustering algorithm also includes, for each examined pair of clusters, repeatedly swapping pairs of nodes between the pair of clusters when a swap of a pair of nodes satisfies two conditions. The first condition is that the swap would reduce a cut weight of the graph, wherein the cut weight is a sum of edge weights of edges that connect nodes in different clusters. The second condition is that the swap would locate each node of the pair of nodes, when swapped to the other cluster of the examined pair of clusters, within a defined maximum distance from the centroid of the other cluster.

Finally, at 812, information describing geographic locations of centroids of the second plurality of clusters is caused to be presented to a user as the plurality of recommended geographic server locations.

Figure 9:
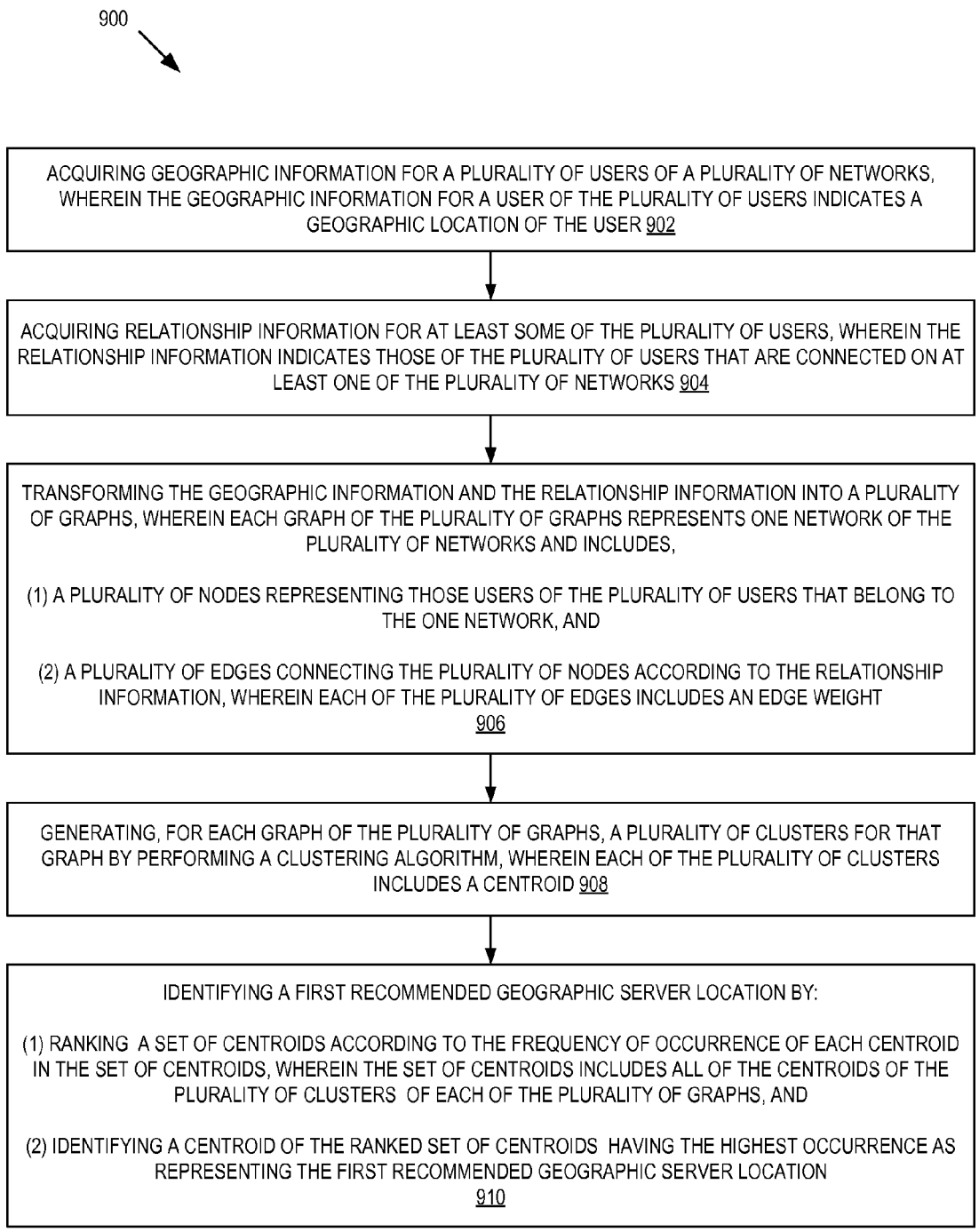
FIG. 9 illustrates determine a plurality of recommended geographic server locations by attempting to minimize both user-server latency and a latency of inter-user communications using a joint analysis approach based upon characteristics of a plurality of networks according to one embodiment of the invention.

FIG. 9 illustrates a flow 900 to determine a plurality of recommended geographic server locations by attempting to minimize both user-server latency and a latency of inter-user communications using a joint analysis approach based upon characteristics of a plurality of networks according to one embodiment of the invention.

At 902, the flow 900 includes acquiring geographic information for a plurality of users of a plurality of networks. The geographic information for a user of the plurality of users indicates a geographic location of the user. In an embodiment of the invention, the plurality of networks is a plurality of online social networks. At 904, relationship information is acquired for at least some of the plurality of users. The relationship information indicates those of the plurality of users that are connected on at least one of the plurality of networks.

The geographic information and the relationship information are transformed into a plurality of graphs 906. Each graph of the plurality of graphs represents one network of the plurality of networks. Each of the graphs includes a plurality of nodes representing those users of the plurality of users that belong to the one network, and a plurality of edges connecting the plurality of nodes according to the relationship information. Each of the plurality of edges includes an edge weight.

At 908, the flow 900 includes generating, for each graph of the plurality of graphs, a plurality of clusters for that graph by performing a clustering algorithm. Each cluster of the plurality of clusters includes a centroid. Finally, at 910 a first recommended geographic server location is identified. First, a set of centroids is ranked according to the frequency of occurrence of each centroid in the set of centroids. This set of centroids includes all of the centroids of the plurality of clusters of each of the plurality of graphs. Next, a centroid of the ranked set of centroids that has the highest occurrence is identified as representing the first recommended geographic server location.

Alternative Embodiments

While embodiments of the invention have been described in relation to OSNs, the techniques disclosed herein can easily be extended by one of skill in the art to be useful in a wide variety of further applications.

For example, in the near future there will likely be billions of new devices connected to the Internet. Going widely beyond traditional computing devices such as the computers and mobile phones of today, future devices may include everyday objects such as desks, chairs, glasses, bikes, microwaves, refrigerators, shopping carts, cars, and traffic lights. While many of these devices are considered geographically stationary (as they typically are used in one location or a few geographically similar locations), many others are mobile, much like human users in OSNs. Such future devices will likely have embedded communication and data processing capabilities, and with the help of software and services, these devices will conceptually be able to communicate with each other as human friends do on OSNs today. Thus, when designing new services or networks that support such a large magnitude of networked devices, communications must be optimized and thus the techniques described herein will be applicable.

Similarly, consider the field of messaging-oriented middleware (MoM) or messaging services, such as the existing Enterprise Service Bus systems (ESB). In general, these messaging services have a large set of endpoints ("publishers" and "subscribers") that communicate via a conceptually centralized server. The server dispatches messages according to the matching between subscribers' interests and published contents. In actual implementations, however, the system should also be optimized for scalability reasons by using a set of distributed servers.

In all of the above cases, just like the OSNs discussed herein, these networks also must solve the server placement problem by considering messaging latencies, communication patterns (or social strengths) of nodes, and costs of data centers; accordingly, the systems, methods, and apparatuses disclosed are equally applicable and beneficial in these environments.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device for determining a plurality of server placement locations, the method comprising:
    generating, by the computing device, a first plurality of clusters by performing a first clustering algorithm on a graph, wherein the graph includes a plurality of nodes representing a plurality of users and a plurality of edges connecting the plurality of nodes according to known relationships between the plurality of users, wherein each edge of the plurality of edges includes an edge weight, wherein each cluster of the first plurality of clusters includes a centroid and a set of one or more nodes of the plurality of nodes, wherein each node of the set of nodes is included in only one cluster of the first plurality of clusters;
    generating, by the computing device, a second plurality of clusters by performing a second clustering algorithm comprising,
        for each pair of clusters of one or more pairs of clusters of the first plurality of clusters, swapping nodes between the pair of clusters when a swap will:
            reduce a total cut weight of the graph, wherein the total cut weight is a sum of edge weights of all edges of the plurality of edges that connect nodes in different clusters, and
            locate each node of the pair of nodes, when swapped to the other cluster of the pair of clusters, within a defined maximum distance from the centroid of the other cluster; and
    causing, by the computing device, information describing geographic locations associated with centroids of the second plurality of clusters to be presented to a user as the plurality of server placement locations.

2. The method of claim 1, wherein:
    each of the edge weights is an estimated network latency time between those users of the plurality of users represented by the nodes at each end of the edge; and
    an initial location of each node of the plurality of nodes of the graph is selected based upon a determined geographic location of one or more users of the plurality of users that are represented by the node.

3. The method of claim 1, wherein the plurality of users are a plurality of networked devices.

4. The method of claim 1, wherein the plurality of users are a plurality of endpoints utilizing one or more messaging services, wherein the plurality of endpoints comprise one or more publishers and one or more subscribers.

5. The method of claim 1, further comprising:
    generating, by the computing device, the graph by performing operations including:
        transforming a geographic location of each user of the plurality of users into a latitude-longitude coordinate;
        aggregating, one or more times, those users of the plurality of users having latitude-longitude coordinates located within a defined distance of each other into one node to thereby create the plurality of nodes, wherein a weight of each node of the plurality of nodes indicates how many of the plurality of users are represented by that node;
        connecting those nodes of the plurality of nodes using the plurality of edges based upon determining whether any of the users aggregated by those nodes are connected as indicated by relationship information; and
        assigning the edge weight to each edge of the plurality of edges to indicate the number of connections between those users of the plurality of users represented by the nodes of the plurality of nodes at each end of that edge.

6. A non-transitory computer-readable storage medium having instructions which, when executed by one or more processors of a computing device, cause the one or more processors to determine a plurality of server placement locations by performing operations comprising:
    generating a first plurality of clusters by performing a first clustering algorithm on a graph, wherein the graph includes a plurality of nodes representing a plurality of users and a plurality of edges connecting the plurality of nodes according to known relationships between the plurality of users, wherein each edge of the plurality of edges includes an edge weight, wherein each cluster of the first plurality of clusters includes a centroid and a set of one or more nodes of the plurality of nodes, wherein each node of the set of nodes is included in only one cluster of the first plurality of clusters;
    generating a second plurality of clusters by performing a second clustering algorithm comprising,
        for each pair of clusters of one or more pairs of clusters of the first plurality of clusters, swapping nodes between the pair of clusters when a swap will:
            reduce a total cut weight of the graph, wherein the total cut weight is a sum of edge weights of all edges of the plurality of edges that connect nodes in different clusters, and
            locate each node of the pair of nodes, when swapped to the other cluster of the pair of clusters, within a defined maximum distance from the centroid of the other cluster; and
    causing information describing geographic locations associated with centroids of the second plurality of clusters to be presented to a user as the plurality of server placement locations.

7. The non-transitory computer-readable storage medium of claim 6, wherein:
    each of the edge weights is an estimated network latency time between those users of the plurality of users represented by the nodes at each end of the edge; and
    an initial location of each node of the plurality of nodes of the graph is selected based upon a determined geographic location of one or more users of the plurality of users that are represented by the node.

8. The non-transitory computer-readable storage medium of claim 6, wherein the plurality of users are a plurality of networked devices.

9. The non-transitory computer-readable storage medium of claim 6, wherein the plurality of users are a plurality of endpoints utilizing one or more messaging services, wherein the plurality of endpoints comprise one or more publishers and one or more subscribers.

10. The non-transitory computer-readable storage medium of claim 6, wherein the operations further comprise:
   generating the graph by performing additional operations including:
      transforming a geographic location of each user of the plurality of users into a latitude-longitude coordinate;
      aggregating, one or more times, those users of the plurality of users having latitude-longitude coordinates located within a defined distance of each other into one node to thereby create the plurality of nodes, wherein a weight of each node of the plurality of nodes indicates how many of the plurality of users are represented by that node;
      connecting those nodes of the plurality of nodes using the plurality of edges based upon determining whether any of the users aggregated by those nodes are connected as indicated by relationship information; and
      assigning the edge weight to each edge of the plurality of edges to indicate the number of connections between those users of the plurality of users represented by the nodes of the plurality of nodes at each end of that edge.

11. A method in a computing device for determining a plurality of server placement locations, the method comprising:
   generating, by the computing device, a first plurality of clusters by performing a first clustering algorithm on a graph, wherein the graph includes a plurality of nodes representing a plurality of users and a plurality of edges connecting the plurality of nodes according to known relationships between the plurality of users, wherein each edge of the plurality of edges includes an edge weight, wherein each cluster of the first plurality of clusters includes a centroid and a set of one or more nodes of the plurality of nodes, wherein each node of the set of nodes is included in only one cluster of the first plurality of clusters;
   generating, by the computing device, a second plurality of clusters by performing a second clustering algorithm comprising,
      for each pair of clusters of one or more pairs of clusters of the first plurality of clusters, swapping nodes between the pair of clusters when a swap will:
         reduce a total cut weight of the graph, wherein the total cut weight is a sum of edge weights of all edges of the plurality of edges that connect nodes in different clusters, and
         locate each node of the pair of nodes, when swapped to the other cluster of the pair of clusters, within a defined maximum distance from the centroid of the other cluster; and
   allocating, based upon locations of centroids of the second plurality of clusters, server resources at two or more server locations.

12. The method of claim 11, wherein the allocating the server resources at the two or more server locations comprises enabling one or more virtual machine instances.

13. The method of claim 11, wherein the allocating the server resources at the two or more server locations comprises enabling one or more network instances.

14. The method of claim 11, wherein the plurality of users are a plurality of networked devices.

15. The method of claim 11, wherein the plurality of users are a plurality of endpoints utilizing one or more messaging services, wherein the plurality of endpoints comprise one or more publishers and one or more subscribers.

16. A non-transitory computer-readable storage medium having instructions which, when executed by one or more processors of a computing device, cause the one or more processors to determine a plurality of server placement locations by performing operations comprising:
   generating a first plurality of clusters by performing a first clustering algorithm on a graph, wherein the graph includes a plurality of nodes representing a plurality of users and a plurality of edges connecting the plurality of nodes according to known relationships between the plurality of users, wherein each edge of the plurality of edges includes an edge weight, wherein each cluster of the first plurality of clusters includes a centroid and a set of one or more nodes of the plurality of nodes, wherein each node of the set of nodes is included in only one cluster of the first plurality of clusters;
   generating a second plurality of clusters by performing a second clustering algorithm comprising,
      for each pair of clusters of one or more pairs of clusters of the first plurality of clusters, swapping nodes between the pair of clusters when a swap will:
         reduce a total cut weight of the graph, wherein the total cut weight is a sum of edge weights of all edges of the plurality of edges that connect nodes in different clusters, and
         locate each node of the pair of nodes, when swapped to the other cluster of the pair of clusters, within a defined maximum distance from the centroid of the other cluster; and
   allocating, based upon locations of centroids of the second plurality of clusters, server resources at two or more server locations.

17. The non-transitory computer-readable storage medium of claim 16, wherein the allocating the server resources at the two or more server locations comprises enabling one or more virtual machine instances.

18. The non-transitory computer-readable storage medium of claim 16, wherein the allocating the server resources at the two or more server locations comprises enabling one or more network instances.

19. The non-transitory computer-readable storage medium of claim 16, wherein the plurality of users are a plurality of networked devices.

20. The non-transitory computer-readable storage medium of claim 16, wherein the plurality of users are a plurality of endpoints utilizing one or more messaging services, wherein the plurality of endpoints comprise one or more publishers and one or more subscribers.

* * * * *